United States Patent [19]

Kim et al.

[11] Patent Number: 5,703,738
[45] Date of Patent: Dec. 30, 1997

[54] MAGNETIC HEAD MAGNETO-RESISTIVE ELEMENT WITH C-SHAPED MULTI-LAYERED STRUCTURE

[75] Inventors: In-eung Kim, Seoul; Alexandre M. Choukh, Suwon, both of Rep. of Korea

[73] Assignee: Samsung Electro-Mechanics Co., Ltd., Suwon, Rep. of Korea

[21] Appl. No.: 472,975

[22] Filed: Jun. 7, 1995

[30] Foreign Application Priority Data

Jan. 27, 1995 [KR] Rep. of Korea .................. 95-1560

[51] Int. Cl.$^6$ ........................................... G11B 5/39
[52] U.S. Cl. ............................................... 360/113
[58] Field of Search ................ 360/113; 324/207.21, 324/252; 338/32 R

[56] References Cited

U.S. PATENT DOCUMENTS

| | | | |
|---|---|---|---|
| 4,755,897 | 7/1988 | Howard | 360/113 |
| 4,771,349 | 9/1988 | Tsang | 360/113 |
| 4,954,920 | 9/1990 | Yamada et al. | 360/113 |
| 4,967,298 | 10/1990 | Mowry | 360/113 |
| 5,268,806 | 12/1993 | Goubau et al. | 360/113 |
| 5,325,253 | 6/1994 | Chen et al. | 360/113 |
| 5,327,313 | 7/1994 | Nishioka et al. | 360/113 |

*Primary Examiner*—Robert S. Tupper
*Assistant Examiner*—Brian E. Miller
*Attorney, Agent, or Firm*—Cushman Darby & Cushman, IP Group Of Pillsbury Madison & Sutro LLP

[57] ABSTRACT

A magneto-resistive (MR) element of a thin-film magnetic head comprises a three-layer structure. The three-layer structure comprises a layer of soft magnetic material, a thin non-magnetic decoupling layer and an MR layer, and has an ellipse-like C-shape with a gap in its back passive region. The axis of easy magnetization of the MR layer is parallel to the main axis of the ellipse-like C-shape three-layered structure. The MR layer is longitudinally biased by an exchange bias field developed by exchange coupling between the antiferromagnetic layer and the MR layer. The antiferromagnetic layer is deposited in direct contact only in the back passive region of the MR layer of a level sufficient to maintain that region of the MR layer in a linear response mode. Spaced conductor leads are connected directly to the MR layer within the front active region to define a detection region, and through the antiferromagnetic layer in the back passive region.

9 Claims, 2 Drawing Sheets

L: LENGTH OF MAGNETO-RESISTIVE ELEMENT h: WIDTH OF MAGNETO-RESISTIVE ELEMENT

MAGNETIC HEAD MAGNETO-RESISTIVE ELEMENT WITH C-SHAPED MULTI-LAYERED STRUCTURE

BACKGROUND OF THE INVENTION

The present invention relates to a magneto-resistive element for a thin-film magnetic head. More particularly, a magneto-resistive element of a thin-film magnetic head is provided with a magnetic exchange layer for applying a magnetic bias longitudinally to a magneto-resistive element so that inner environmental characteristics are improved, to thereby enhance output characteristics.

A thin-film magnetic head is mainly applied in a digital signal processing system, such as a hard disk drive or video tape recorder. It has also been adopted in a recently developed digital compact cassette player.

Such a thin-film magnetic head uses a magneto-resistive element whose resistance varies according to the strength of an applied magnetic field. To enhance certain output characteristics thereof, a bias (both longitudinal and transverse) must be applied to the magneto-resistive element. The magneto-resistive element is a multilayered structure and may consist of a magneto-resistive film, a nonmagnetic insulating or resistive film, a bias film, etc.

FIG. 1 shows an example of a magneto-resistive element having the above-mentioned multilayered structure. The structure is composed of a layered sequence of magneto-resistive film 11, conductive film 12, insulating film 13 and soft-magnetic bias film 14. A longitudinal bias is not applied to the above multilayered structure, thus causing a Barkhausen noise problem to occur during reproduction. Also, the multilayer structure is not suitable for narrow-track recording and therefore cannot be used for high-density recording.

FIG. 2 shows a magneto-resistive element having an improved multilayer structure. Antiferromagnetic exchange layers are provided, for applying a longitudinal magnetic bias in the plane of the element, at both ends of the element. In the magneto-resistive element of FIG. 2, a nonmagnetic decoupling film 16 and magnetoresistive film 17 are sequentially layered on soft-magnetic bias film 15. On both ends of magnetoresistive film 17, antiferromagnetic exchange films 18 for applying a bias in the longitudinal direction of the element are layered, and conductor leads 19 are layered on the antiferromagnetic exchange films, so that a multilayered structure is formed.

In the magneto-resistive element having the above structure, the transverse bias of the soft magnetic film 15 and the longitudinal bias of the antiferromagnetic exchange film 18 apply an appropriate magnetic bias to magneto-resistive film 17, so that the magneto-resistive element can have high output performance characteristics.

However, in the magneto-resistive element having above multilayered structure, antiferromagnetic Fe-Mn alloy is used for magnetic exchange film 18. This alloy, however, is directly exposed to the surface in contact with the recording medium, which gives rise to the possibility of corrosion, thereby degrading the inner environmental characteristics of the magneto-resistive element.

A demagnetization field ($H_{DL}$) in the stripped magnetoresistive element is expressed in the following formula (1).

$$H_{DL} = 4\pi M_s \, h/L \quad (1)$$

Here, $M_S$ is the saturation magnetic flux density of the magneto-resistive element, and h and L are, respectively, the width and length of the magneto-resistive strip.

As shown in FIG. 3, the h/L value in formula (1) has a limit for minimization due to the structural characteristics of the stripped magnetoresistive element.

Thus, the bias magnetic field $H_{BL}$ for making a single magnetization domain in the longitudinal direction of the magneto-resistive element, is expressed in following formula (2).

$$H_{BL} > H_{DL} + H_C \quad (2)$$

Here, $H_C$ is the coercive force of the magneto-resistive element.

Referring to formula (2), therefore, as demagnetization field value $H_{DL}$ increases, bias magnetization field value $H_{BL}$ increases accordingly to compensate for the increased $H_{DL}$, thereby decreasing the sensitivity of the magnetic head with the reverse magnetic domain effect.

SUMMARY OF THE INVENTION

To solve the above-mentioned problems, it is an object of the present invention to provide a magneto-resistive element for a thin-film magnetic head, being provided with an antiferromagnetic exchange layer for applying bias longitudinally to the magneto-resistive element so that inner environmental characteristics are improved, to thereby enhance output characteristics.

Accordingly, to achieve the above object, there is provided a magneto-resistive element for a thin-film magnetic head comprising: a three layer structure composed of a soft magnetic film layer, a thin nonmagnetic spacer layer and a magneto-resistive layer. The element has an ellipse-like C-shape with a gap in the back passive region of the three layered structure. An antiferromagnetic layer covers the magnetoresistive layer in the back passive region; and spaced conductor leads are connected directly to the magneto-resistive layer within an active front region to define a detection region. The spaced conductor leads overlap the antiferromagnetic exchange layer in the back passive region of the three layered structure, and are separated in the back passive region by a gap.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
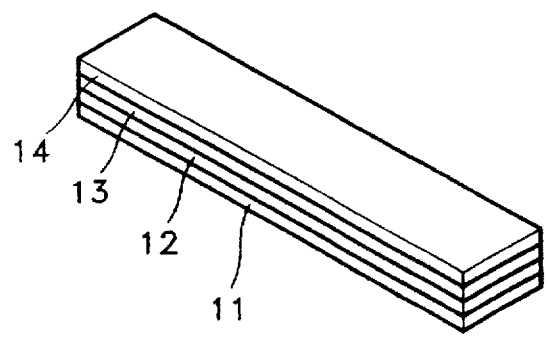
FIG. 1 is a schematic illustrating an example of a multilayer structure of a conventional magneto-resistive element without longitudinal magnetic bias.
Figure 2:
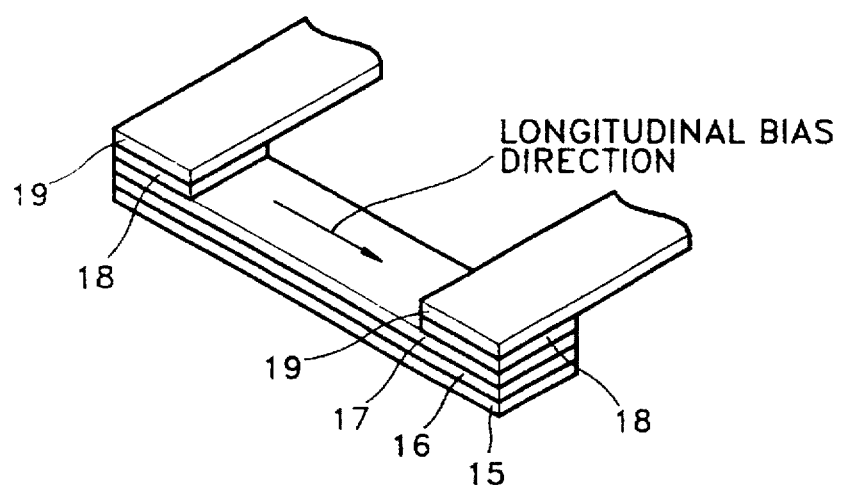
FIG. 2 is a schematic illustrating another example of a multilayer structure of a conventional magneto-resistive element with longitudinal magnetic bias.
Figure 3:
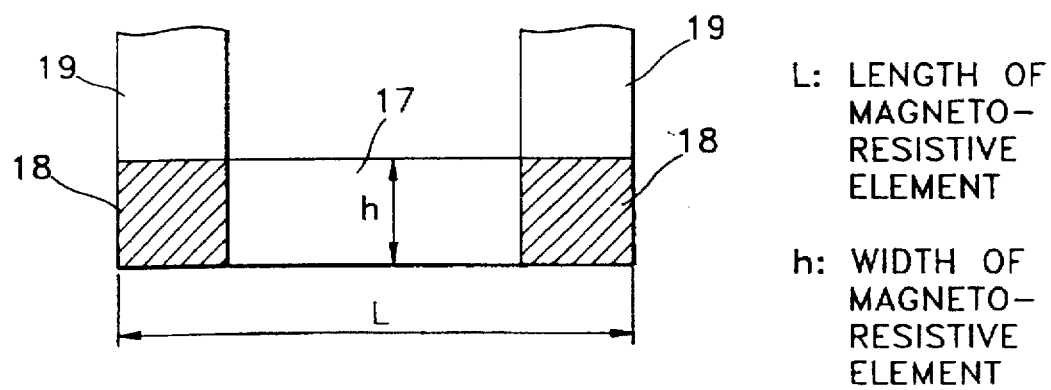
FIG. 3 is a cross-section illustrating the magneto-resistive element of FIG. 2.
Figure 4:
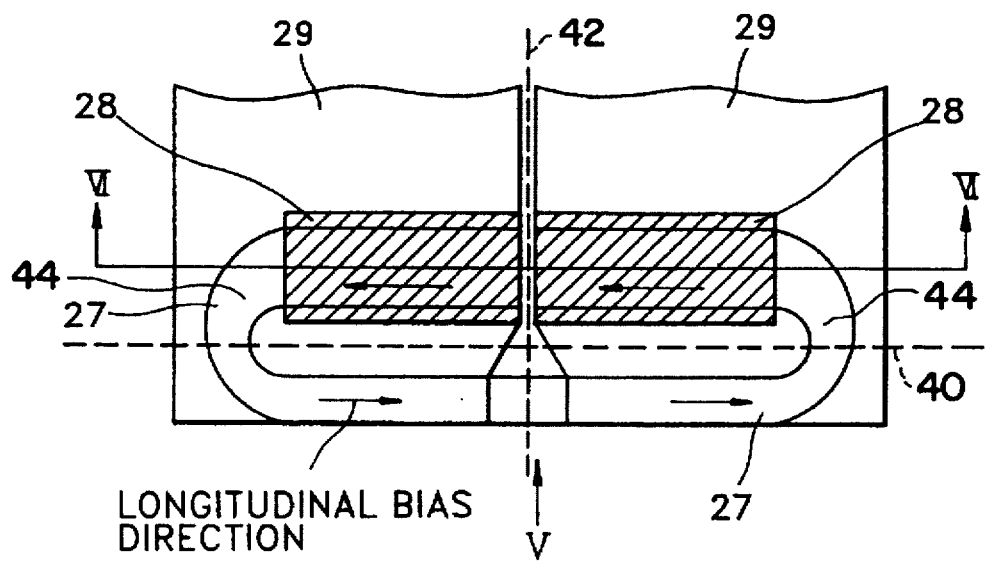
FIG. 4 is a plan view schematically illustrating a magneto-resistive element according to the present invention.
Figure 5:
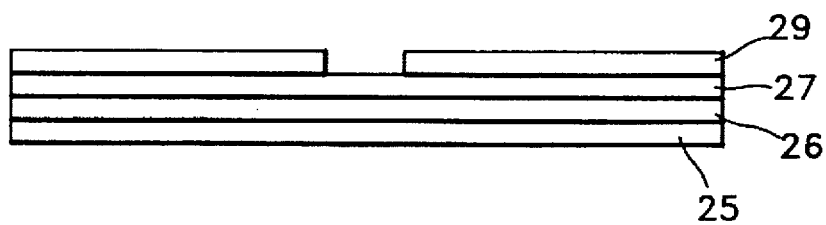
FIG. 5 is a front view, being viewed from V, illustrating a magneto-resistive element according to the present invention shown in FIG. 4.

FIG. 4 is a plan view schematically showing a magneto-resistive element according to the present invention. FIG. 5 is a front view, being viewed from V, showing a magneto-resistive element according to the present invention shown in FIG. 4, and FIG. 6 is a cross-sectional view taken along the line VI—VI illustrating a magneto-resistive element according to the present invention shown in FIG. 4.

Figure 6:
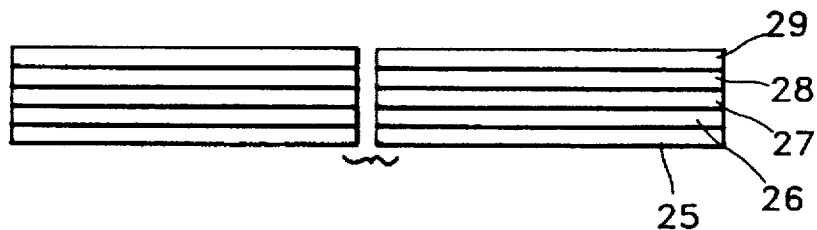
FIG. 6 is a cross-sectional view taken along the line VI—VI illustrating a magneto-resistive element according to the present invention shown in FIG. 4

Referring to FIGS. 4 to 6, the magneto-resistive element, according to present invention, comprises successively deposited layers including a soft magnetic film layer 25, the nonmagnetic spacer layer 26, and a magneto-resistive layer 27. The three layered structure is formed into an ellipse-like C-shape with a small gap in the back passive region, which is opposite to the air bearing surface (ABS) of the thin film magnetic head. An axis of easy magnetization of the magneto-resistive layer 27 is oriented parallel to the main axis of the ellipse-like three layer structure. The three layers 25, 26 and 27 are each substantially planar and lie in a plane substantially parallel to a main plane defined by a first axis 40 and a second axis 42 orthogonal to the first axis 40. An antiferromagnetic layer 28 is deposited in direct contact only in the back passive region of the magneto-resistive layer 27. The antiferromagnetic layer 28 creates an interfacial exchange interaction with the magneto-resistive layer 27 that results in an effective bias field experienced by the magneto-resistive layer 27. The resulting bias field is oriented longitudinally and is of a level sufficient to maintain the passive end regions 44 of the MR layer 27 in the single domain state, and thereby to induce a single domain state in the front active region of the MR layer. The spaced conductor leads 29, over which the bias current is supplied to the magneto-resistive layer and the output signal is sensed, are layered directly onto magnetic-resistive layer 27 in the front active region and over the antiferromagnetic layer 28 in the back passive region. The spaced conductor leads determine the active read region of the magneto-resistive layer which is provided with a transverse bias of a level sufficient to maintain that region of the MR layer in the linear response mode.

In the magneto-resistive element formed in the above structure of thin-film magnetic head according to the present invention, the axis of magnetization is formed latitudinally.

Thus, the above-mentioned ellipse-like C-shape structure of the MR element with a small gap is a "magnetically closed" structure and therefore has a reduced value of longitudinal demagnetization field $H_{DL}$. The reduction of the demagnetization field is an effective measure to facilitate realizing a single domain state in the MR element. A smaller value of longitudinal bias field, than in case of stripped MR element use, is required to maintain the active region of the MR element in single domain state, to thereby eliminate the Barkhausen noise in output signal. At the same time, the value of the longitudinal bias field $H_{BL}$ does not affect a considerable increase in the effective magnetic anisoptropy of the magneto-resistive element, thereby decreasing the head sensitivity to signal magnetic flux. The effective longitudinal bias field is created by an interfacial exchange interaction of the antiferromagnetic exchange layer 28 with the magneto-resistive layer 27. Therefore, Barkhausen noise can be eliminated and the output characteristics of the magnetic head can be improved.

As described above, in the magneto-resistive element for a thin-film magnetic head according to the present invention, a three layer structure formed of a soft magnetic film layer, a nonmagnetic spacer layer and a magneto-resistive layer has an ellipse-like C-shape with a small gap in the back passive region of the magneto-resistive element. The longitudinal bias field is provided an antiferromagnetic exchange layer deposited with magneto-resistive element. Output characteristics are enhanced by realizing a stable single domain structure in the active region of magneto-resistive element at a low value of longitudinal bias.

What is claimed is:

1. A magneto-resistive element for a thin-film magnetic head comprising:

a structure of three layers respectively comprising a soft magnetic film layer, a thin nonmagnetic spacer layer over said soft magnetic film and a magneto-resistive layer over said thin nonmagnetic spacer layer, said three layers each being substantially parallel to a main plane, and collectively defining an ellipse-like C-shape with a gap at the opened portion of said C-shape, said C-shape lying in a plane parallel to said main plane and having a longitudinal axis parallel to said main plane, said structure having an active front region comprising portions of said three layers in front of said longitudinal axis and a passive back region comprising portions of said three layers behind said longitudinal axis, said ellipse-like C-shape having said gap in said passive back region;

an antiferromagnetic layer covering said magnetoresistive layer in said passive back region; and conductor leads each connected directly to said magneto-resistive layer within said active front region to define a detection region therebetween, said spaced conductor leads overlapping said antiferromagnetic layer in said passive back region.

2. The magneto-resistive element for a thin-film magnetic head of claim 1, wherein said antiferromagnetic layer has a gap in said passive back region corresponding in size to said gap of said ellipse-like C-shape.

3. The magneto-resistive element for a thin-film magnetic head of claim 1, wherein said antiferromagnetic layer is in direct contact with said magneto-resistive layer only in said passive back region, producing a longitudinal bias directly in said passive back region only by exchange biasing of a level sufficient to maintain said passive back region of said magneto-resistive layer in a single domain state.

4. The magneto-resistive element for a thin-film magnetic head of claim 1, wherein an axis of easy magnetization of said magneto-resistive layer is parallel to said longitudinal axis of said ellipse-like C-shape three-layer structure.

5. A magneto-resistive element for a thin-film magnetic head, said magneto-resistive element comprising:

a multi-layer structure defining an ellipse-like C-shape and comprising a soft magnetic film, a thin nonmagnetic spacer layer over said soft magnetic film, and a magneto-resistive layer over said thin non-magnetic spacer layer, each of said soft magnetic film, said thin non-magnetic spacer layer, and said magneto-resistive layer being substantially planar and lying in a plane substantially parallel to a main plane said multi-layer structure comprising:
   an elongated active front portion having first and second ends and extending parallel to a first axis lying in said main plane,
   first and second side portions separated by a gap and respectively contiguous with said first and second ends of said active front portion and each extending in a direction parallel to a second axis perpendicular to said first axis, and
   first and second passive back portions respectively contiguous with said first and second side portions and each extending parallel to said first axis,
   all of said front portion being located in front of said first axis and all of said first and second back portions being located behind said first axis;

an antiferromagnetic layer covering a portion of said magneto-resistive layer, all of said antiferromagnetic layer being located behind said first axis; and spaced conductor leads each directly contacting said magneto-resistive layer at respective positions which are in front of said first axis, said spaced conductor leads overlapping said antiferromagnetic layer at positions which are behind said first axis.

6. The magneto-resistive element according to claim 5, wherein said spaced conductor leads comprise two spaced conductor leads, including a first conductor lead directly contacting said magneto-resistive layer at said first end of said active front portion, and a second conductor lead directly contacting said magneto-resistive layer at said second end of said active front portion, each of said spaced conductor leads having a first substantial portion substantially planar and lying in a first plane parallel to said main plane at positions in front of said first axis, and having a second substantial portion substantially planar and lying in a second plane parallel to and spaced from said first plane at positions behind said first axis.

7. The magneto-resistive element according to claim 5, wherein said multi-layer structure comprises a first gap between said first and second side portions, said first gap being located behind said first axis, said antiferromagnetic layer comprising a second gap in said passive back region corresponding in size to said first gap.

8. The magneto-resistive element according to claim 5, wherein said antiferromagnetic layer is in direct contact with said antiferromagnetic layer only in said passive back region, producing a longitudinal bias directly in said passive back region only by exchange biasing of a level sufficient to maintain said passive back region of said magneto-resistive layer in a single domain state.

9. The magneto-resistive element according to claim 5, wherein an axis of easy magnetization of said magneto-resistive layer is parallel to said first axis.

* * * * *